United States Patent [19]

Ehrlich

[11] 4,187,996
[45] Feb. 12, 1980

[54] HANGING PLANT ELEVATOR

[76] Inventor: Sol Ehrlich, 49 W. 53rd St., New York, N.Y. 10019

[21] Appl. No.: 962,930

[22] Filed: Nov. 22, 1978

[51] Int. Cl.$^2$ .......................................... B65H 75/48
[52] U.S. Cl. ................. 242/107.4 R; 47/67; 242/107.4 C; 248/330.1
[58] Field of Search ............... 242/107.4 R–107.4 E, 242/107.12, 107.13, 107.14, 107.15; 254/152, 153; 362/402; 47/67; 248/329, 330.1

[56] References Cited

U.S. PATENT DOCUMENTS

| 190,881 | 5/1877 | Long | 242/107.4 R |
| 677,758 | 7/1901 | Coldwell et al. | 242/107.4 R |
| 885,172 | 4/1908 | Patrick | 242/107.4 R |

FOREIGN PATENT DOCUMENTS 148853 7/1920 United Kingdom .................. 362/402

Primary Examiner—John M. Jillions
Attorney, Agent, or Firm—Charles E. Temko

[57] ABSTRACT

A device for adjustably supporting potted plants or similar articles from a room ceiling or beam in such manner that it may be conveniently lowered for watering or other attention and subsequently returned to display position. The device includes a housing element having a keyhole opening therein for engaging a concealed anchor, a loop supported by a cord on a spring roller, the roller having latching means for supporting the weight of the plant or other supported article. The latching means is released and re-engaged by horizontal movement of the supported article which moves the cord to other than vertical position.

1 Claim, 8 Drawing Figures

HANGING PLANT ELEVATOR

BACKGROUND OF THE INVENTION

This invention relates generally to the field of spring wound supporting devices and more particularly to an improved device for supporting potted plants and the like from horizontal surfaces such as a ceiling, beam, or other structural member.

It is known in the art to use screw eyes or cup hooks for such purposes, necessitating the disengagement of the supporting wires and cords each time the plant requires watering or fertilization. Re-engagement of the cord or wire usually requires resort to a stepladder or chair, and under some conditions, hazardous maneuvers on the part of the user.

Spring turned reel devices are common in the art, most typically exemplified by the omnipresent window shade. Such devices, for the most part, are latched to prevent retraction of a shade once it has been located in desired position. Under a substantial weight, the spring becomes fully wound, and the device is therefore incapable of supporting a weight in any given location.

The most common expedient for securing an object of substantial weight in adjusted elevated position supported by a cord is to use a pulley and a cleat about which the cord may be wound when adjusted position is reached. However, such construction is not attractive to the eye, and in the case of decorated interiors, unacceptable from this standpoint.

SUMMARY OF THE INVENTION

Briefly stated, the invention contemplates the provision of an improved elevator device including a housing element enclosing a spring reel having a cord wound thereupon. An outer wall of the housing element is adapted to engage and at least partially conceal a threaded member which penetrates a surface of a ceiling or beam. The housing also encloses latching means for adjustably limiting the degree to which the cord may be unwound while permitting the cord to be wound at any time tension thereon is released. The free end of the cord is provided with a loop capable of engaging a hook supporting the plant. In use, the spring reel is locked at a desired point to allow the plant to be supported at a predetermined level. To lower the plant for servicing, the plant is lifted slightly, and moved horizontally to release the latching means and allow the cord to be unwound, following which the plant is lowered to further wind the spring reel. Horizontal movement in an opposite direction re-engages the latching means with the plant at the lower lever. The plant is returned to original location by merely lifting the same and releasing it at desired level, at which time the latching means will be automatically engaged.

BRIEF DESCRIPTION OF THE DRAWINGS

In the drawing, to which reference will be made in the specification, similar reference characters have been employed to designate corresponding parts throughout the several views.

DETAILED DESCRIPTION OF THE DISCLOSED EMBODIMENT

Figure 1:
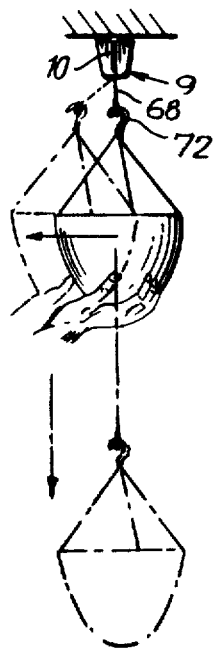
FIG. 1 is a schematic view of an embodiment of the invention showing the required manipulation to lower a supported plant.

In accordance with the invention, the device, generally indicated by reference character 9, comprises broadly a housing element 10, a yoke element 11, a spring reel element 12, and mounting means 13.

The housing element 10 is preferably formed from injection molded synthetic resinous materials to include first and second housing members 20 and 21 which may be heat sealed or cemented together using techniques known in the art. Each of the members 20-21 includes a major sidewall 22, end walls 23 and 24, converging walls 25 and 26, an upper wall 27 and a lower wall 28. The interconnecting means 29 which may be of the usual pin and socket type are integrally molded on the inner surface of the sidewalls 22 for convenience in assembly.

The sidewall 22 forms an inwardly extending bearing member 30 rotatably engaging the yoke element 11 which is penetrated by a screw 31. Vertical and horizontal inner walls 32 and 33, respectively, form a chamber 34 accessed by a key-hole shaped opening 35 in the upper walls 27. The inner surface 37 of one of the sidewalls 22 forms a projection 38, including a cam surface 39 and a locking surface 40 which engages a corresponding portion on the reel element 12 as will more fully appear herein below.

The yoke element 11 is also formed as a synthetic resinous extrusion, and includes an elongated main body 44, an upper end 45 of which defines a transversely extending bore 46 bounded by a laterally extending projection 47 forming a bearing surface 48 which cooperates with the bearing member 30. A second transversely extending opening 50 medially positioned on the main body supports a pintle 51 engaging the reel element 12. A lower end 52 is provided with laterally extending converging cord guide members 53 and 54 defining a slot 55.

The spring reel element 12 is, again, a synthetic resinous molding, and includes a spring reel 60 having a hub member 61 supporting a radially extending body 62. A first laterally extending flange 63 is provided with a plurality of substantially equally spaced locking lugs 64. A second laterally extending flange 65 encloses a coil spring 66, an outer end of which is secured to the flange 65 and an inner end which is secured to the pintle 51. An outer surface 67 provides means about which a cord 68 may be convoluted, a continous segment 69 of which extends through the slot 55.

The lower walls 28 of the housing element 10 define an opening through which the cord passes outwardly of the housing. The free end of the cord is provided with a loop 71 for engagement with a hook 72 on the supported plant pot or other supported article.

The mounting means 13 includes a threaded screw 75 engaging a grommet 76 having flanges 77 defining a groove 78, the width of which corresponds to the narrow portion of the keyhole-shaped opening 35 in the upper walls 27.

Figure 2:
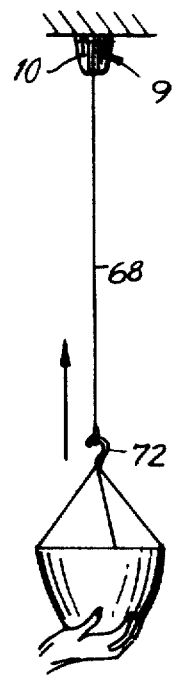
FIG. 2 is a similar schematic view showing the raising of the plant to display location.
Figure 3:
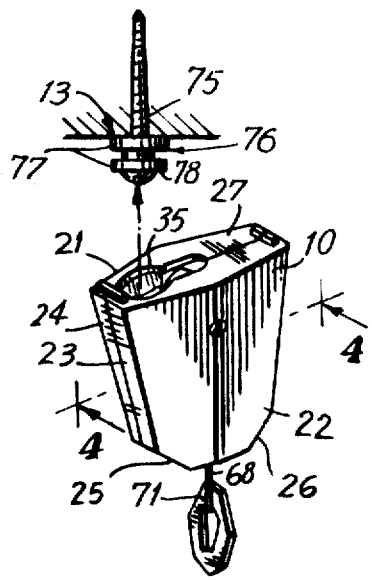
FIG. 3 is an exploded view in perspective showing means for mounting the embodiment upon a horizontal downwardly facing supporting surface.
Figure 5:
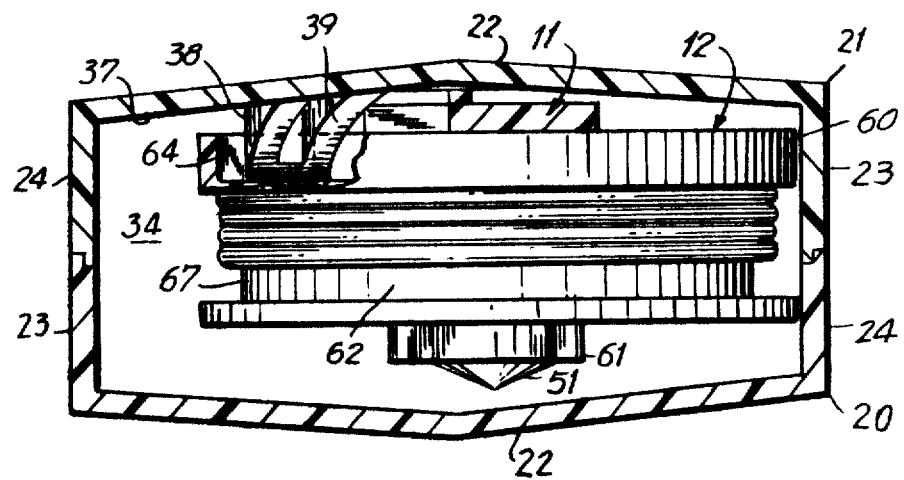
FIG. 5 is a transverse sectional view as seen from the plane 5—5 in FIG. 4.
Figure 4:
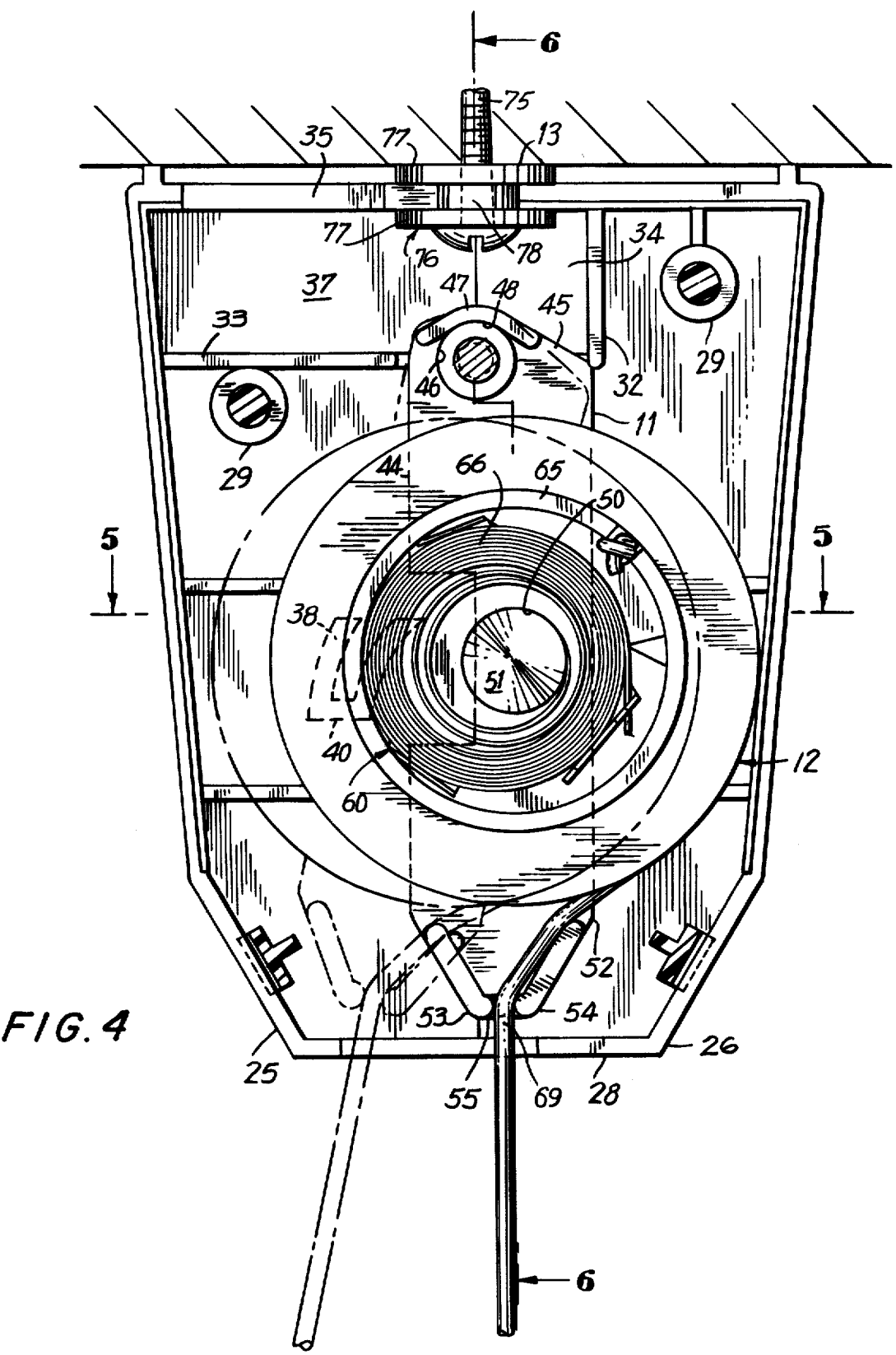
FIG. 4 is a longitudinal central sectional view of the embodiment.
Figure 6:
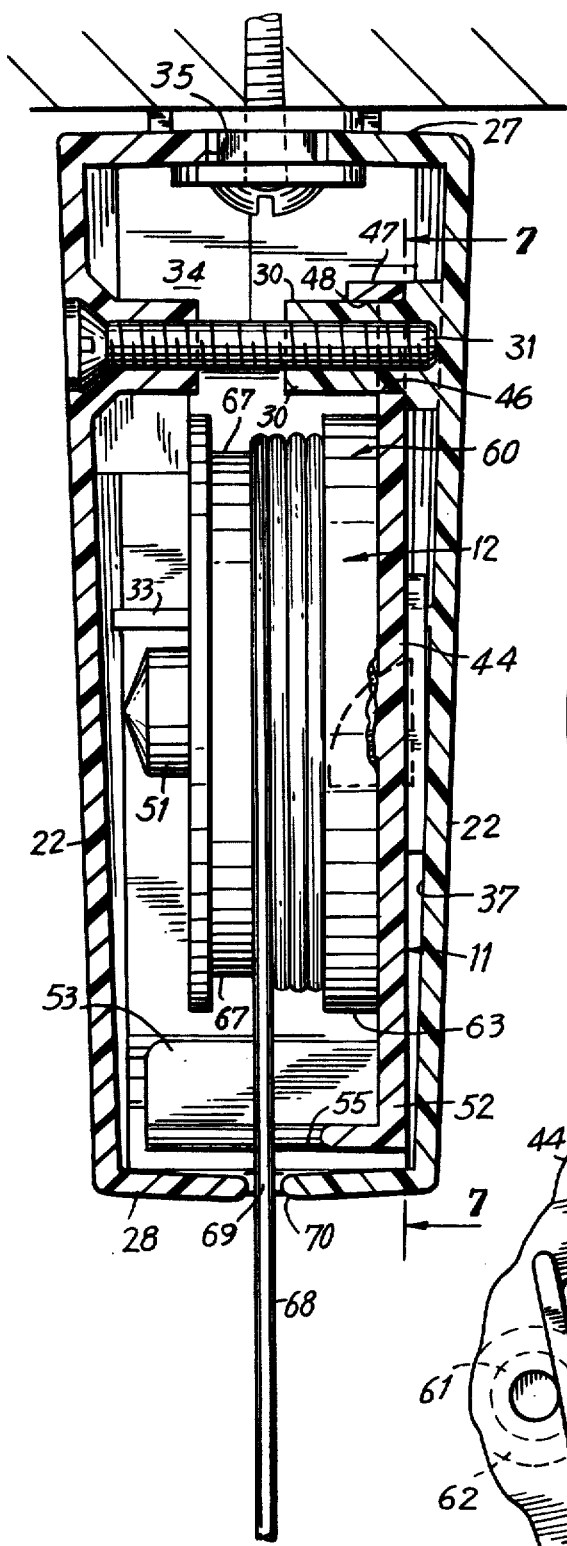
FIG. 6 is a vertical sectional view as seen from the plane 6—6 in FIG. 4.
Figure 7:
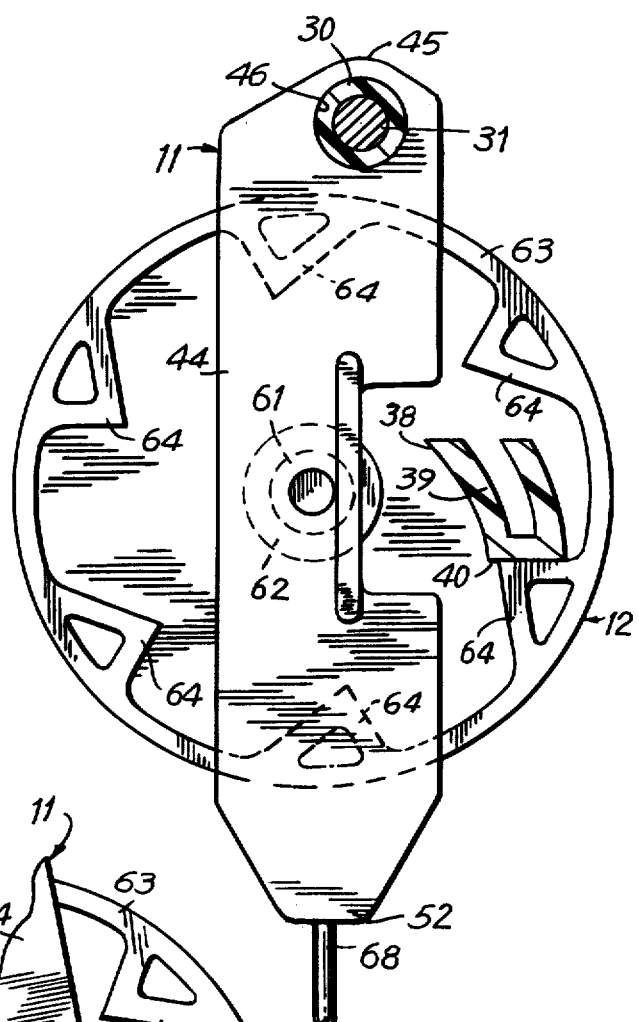
FIG. 7 is a vertical sectional view as seen from the plane 7—7 in FIG. 6.
Figure 8:
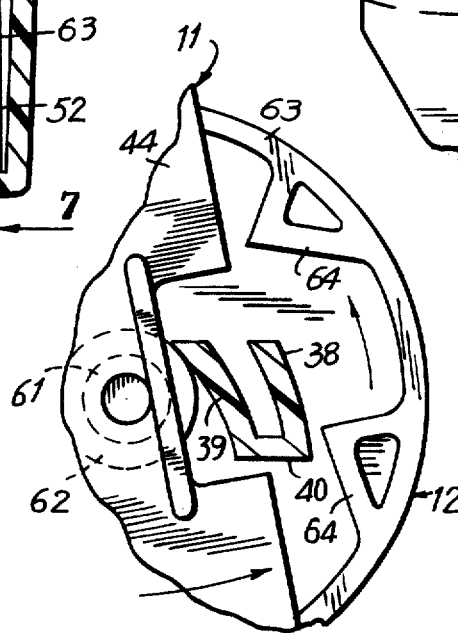
FIG. 8 is a fragmentary view in elevation showing the structure of FIG. 7 in altered relative position.

Installation of the device involves the mounting of the means 13 on a suitable surface following which the housing element 10 is engaged thereon with an inward and subsequently transverse movement. The hook 72 may then be engaged, and the supported article raised to desired location (see FIGS. 1 and 2).

During this operation, the horizontal movement of the loop 71 has served to pivot the yoke element 12 relative to the housing element 10. The reel element 12, being mounted on the yoke element also shifts laterally, to a degree sufficient to prevent engagement of the locking surface 40 on the projection 38 with any of the locking lugs 64. In such position, the cord may be easily unwound, while simultaneously tensing the spring 66. When a desired location is obtained, moving the loop 71 in a reverse horizontal direction again shifts the yoke element, and brings a lug 64 into an orbital path of movement which permits them to be engaged by the projection 38. At this point, the weight of the supported article is borne by the engagement, the tension exerted by the coil spring 66 normally not being sufficient. When the plant is manually raised, the tension on the cord is lessened, permitting the yoke element to pivot in a direction tending to disengage the locking lugs from the projection. Torque exerted by the spring 66 on the yoke element causes this movement, and the locking lugs ride over the projection permitting the cord to be wound. However, as soon as upward movement of the supported article ceases, and the supported article is manually released, the weight of the same re-engages the locking lugs to maintain the supported article in position.

While I have illustrated a preferred embodiment of my invention, in which the spring reel element 12 is carried by the yoke element 11, it will be apparent that simple variations are possible. For example, the spring reel element may be mounted for rotation upon a side wall of the housing element, and the projection 38 carried by the yoke element to obtain a substantially similar result.

It may thus be seen that I have invented novel and highly useful improvements in hanging plant elevators in which, by use of relatively simple structure, a convenient means is provided for adjustably supporting a decorative or utilitarian article from a horizontal supporting surface in such manner that it may be periodically lowered for servicing and returned to display position. The device is both attractive in appearance and may be manufactured at relatively low cost with consequent wide sale distribution.

I wish it to be understood that I do no consider the invention limited to the precise details of structure shown and set forth in this specification, for obvious modifications will occur to those skilled in the art to which the invention pertains.

I claim:

1. A hanging plant elevating device comprising: a housing element, a spring reel element rotatably mounted within said housing element, a cord carried by said reel element and projecting outwardly of said housing element, and engaging means on a free end of said cord; said reel element having at least one locking lug thereon, said housing element having lug engaging means thereon, which, in engaged condition, prevents rotation of said reel element in a direction in which said cord unwinds from said reel element; an elongated yoke element having a first end portion pivotally mounted within and with respect to said housing element, said reel element being rotatably mounted upon said yoke element at a point in spaced relation relative to said first end portion; said yoke element having a second end portion forming means slidably engaging a continuous segment of cord; whereby lateral movement imparted to said cord serves to pivot said yoke element relative to said housing element to selectively engage said lug engaging means with said locking lug.

* * * * *